United States Patent [19]

Loar et al.

[11] Patent Number: 5,344,883
[45] Date of Patent: Sep. 6, 1994

[54] POLYMERIC POWDER COATING COMPOSITIONS COMPRISING LOW MOLECULAR WEIGHT COPOLYMER OR TERPOLYMER SALTS OF α-OLEFINS AND α,β-ETHYLENICALLY UNSATURATED CARBOXYLIC ACIDS

[75] Inventors: Donald F. Loar, Summit, N.J.; Patrick A. Verle, Leefdaal, Belgium

[73] Assignee: AlliedSignal Inc., Morris Township, Morris County, N.J.

[21] Appl. No.: 956,711

[22] Filed: Oct. 5, 1992

[51] Int. Cl.$^5$ .............................................. C08L 67/06
[52] U.S. Cl. .................... 525/170; 525/176; 525/169
[58] Field of Search ...................... 525/170, 169, 176

[56] References Cited

U.S. PATENT DOCUMENTS

| | | |
|---|---|---|
| 3,658,741 | 4/1972 | Knutror et al. . |
| 4,009,224 | 2/1977 | Warnken et al. . |
| 4,381,376 | 4/1983 | Albee et al. . |
| 4,412,040 | 10/1983 | Albee . |
| 4,552,920 | 11/1985 | Goto et al. . |
| 4,778,842 | 10/1988 | Taniguchi . |

FOREIGN PATENT DOCUMENTS 0020253 8/1974 Japan .
56050941 of 1979 Japan .

OTHER PUBLICATIONS

Journal of Paint Technology, vol. 44, No. 565, Feb. 1972, pp. 30–37.
"Properties of Crosslinked Coatings From Modivied Ethylene–Vinyl Acetate Polymer" in Plast, *Chemical Abstracts*, vol. 1, 56, (1983).

*Primary Examiner*—James J. Seidleck
*Assistant Examiner*—I. Zemel
*Attorney, Agent, or Firm*—Melanie L. Brown; Roger H. Criss

[57] ABSTRACT

A polymeric powder coating composition which comprises: (a) polymeric powder coating resin and (b) at least one low molecular weight copolymer salt having a degree of saponification neutralization upto 100%. The powder coating composition may be applied to articles using conventional techniques.

Processes for producing the polymeric powder coating compostiions, and articles comprising the same are also disclosed.

21 Claims, 2 Drawing Sheets

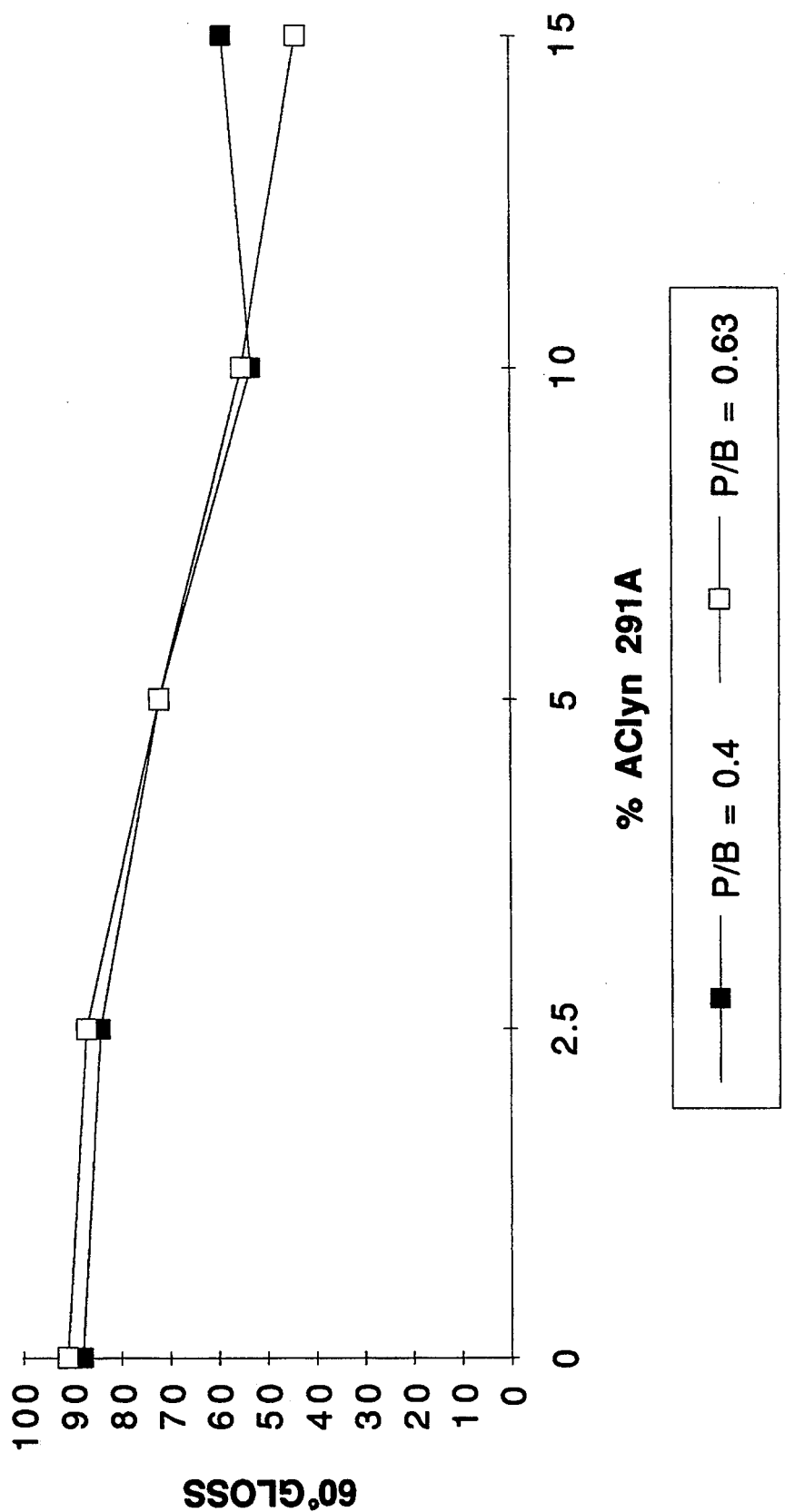

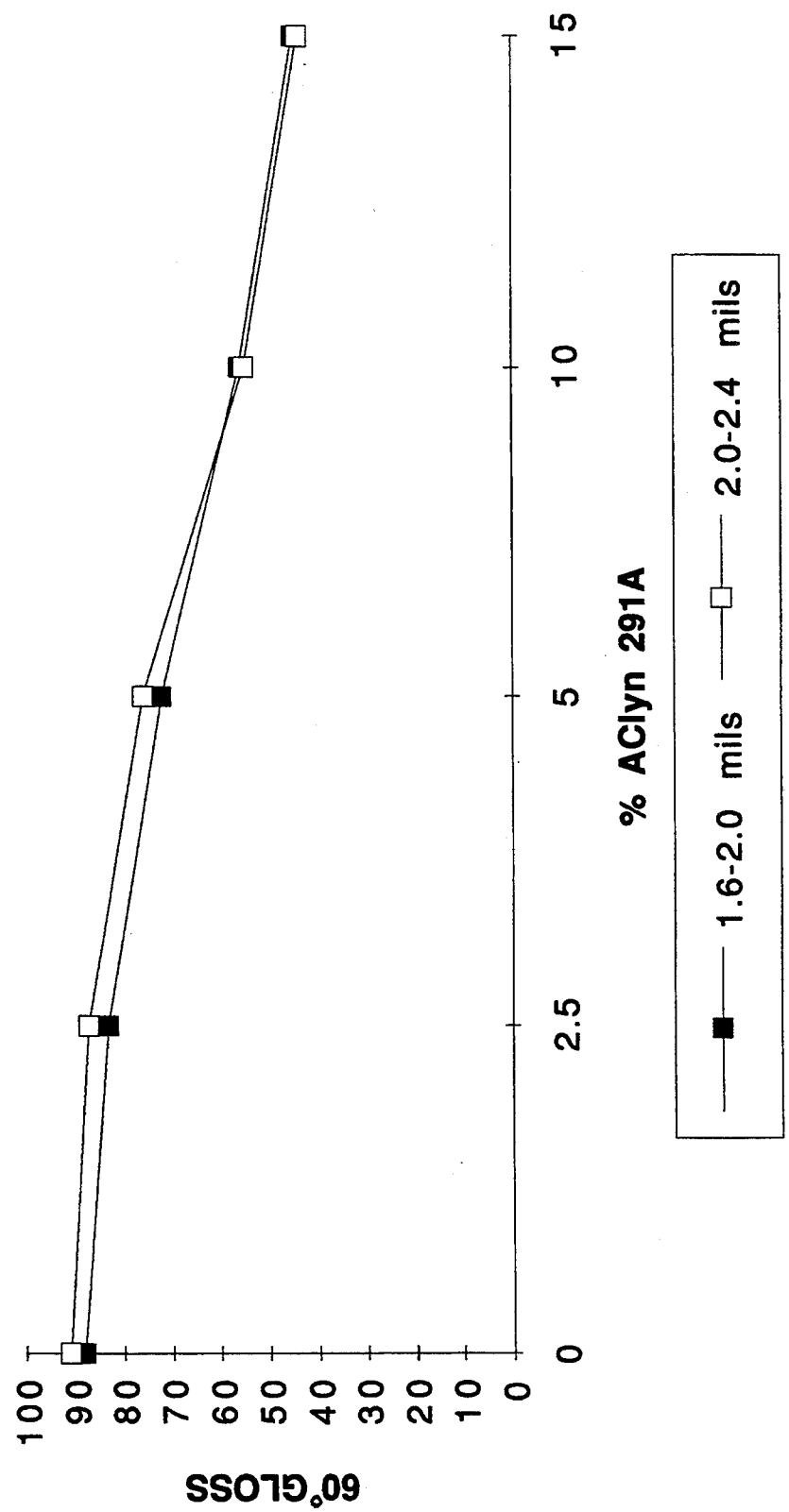

POLYMERIC POWDER COATING COMPOSITIONS COMPRISING LOW MOLECULAR WEIGHT COPOLYMER OR TERPOLYMER SALTS OF α-OLEFINS AND α,β-ETHYLENICALLY UNSATURATED CARBOXYLIC ACIDS

FIELD OF THE INVENTION

The present invention relates to polymeric powder coating compositions. More particularly, the present invention relates to polymeric powder coating compositions which comprise a salt of a copolymer or terpolymer of α-olefin and α,β-unsaturated carboxylic acid.

DESCRIPTION OF THE PRIOR ART

The art includes various teachings directed towards polymeric powder compositions. See for example, U.S. Pat. Nos. 4,552,920 and 4,009,224; "Developments in Thermoplastic Powders" by G. E. Barrett published in the proceedings of the 4th International Plastics Powder Coating Conference, London, UK, 5th and 6th of March 1974; *Chemical Abstracts* 98:73886b titled "Properties of crosslinked coatings from modified ethylene-vinyl acetate polymer" in Plast. Massy 1983, Vol.(1), 56; and Japanese Patent 56050941.

SUMMARY OF THE INVENTION

In one aspect, the present invention provides an improved polymeric powder coating composition which comprises a crosslinkable or curable polymeric resin material and a salt of low molecular weight copolymer or terpolymer having recurring monomeric units derived from an alpha-olefin and recurring monomeric units derived from an α,β-unsaturated carboxylic acid. The copolymer or terpolymer acid salt preferably has a molecular weight from about 500 to about 20,000, more preferably 1,000 to 6,000. the copolymer acid is neutralized up to about 100%, and preferably from 15% to 60%, with at least one cation from the group consisting of metal cations from Groups IA, IIA, and IIB, IIIA and The transition elements of the Periodic table of Elements, with Group IIA and IIB metals being preferred, with magnesium, calcium, sodium and zinc being particularly preferred.

Preferably, the salt is a copolymer salt of a copolymer acid of ethylene and an alpha,beta-ethylenically unsaturated carboxylic acid having 3 to 6 carbon atoms such as acrylic acid, where upto 100% of the acid functions are neutralized. The ethylene and acrylic acid copolymer preferably has an acid number between about 40 and 160. The acid number is measured by milligrams of potassium hydroxide necessary to neutralize one gram of the copolymer acid precursors of the salt.

The composition of this invention exhibits one or more advantages. For example, the composition of this invention provides reduced gloss while not adversely affecting the physical properties of articles formed from the composition (i.e. impact resistance, chemical resistance, flexibility and adhesion of the composition) unduly.

In a further aspect of the present invention, there is provided a process for providing an improved polymeric powder coating to an article which comprises the process step of:

a) melt blending a crosslinkable or otherwise curable conventional polymeric resin material with a salt of low molecular weight copolymer or terpolymer having recurring monomeric units derived from an alpha-olefin and recurring monomeric units derived from an α,β-unsaturated carboxylic acid.

In other aspects of the present invention, there is provided an article which includes a polymeric coating wherein said polymeric coating comprises at least one conventional crosslinkable or otherwise curable polymeric resin material and a salt of low molecular weight copolymer or terpolymer having recurring monomeric units derived from an alpha-olefin and recurring monomeric units derived from an α,β-unsaturated carboxylic acid.

BRIEF DESCRIPTION OF THE FIGURES

FIG. 1 is a graph of % copolymer salt vs. gloss, showing the effect of salt and pigment to binder ratio on gloss.

FIG. 2 is a graph of % copolymer salt vs gloss showing the effect of % salt and film thickness on gloss.

DETAILED DESCRIPTION OF THE INVENTION

The present invention provides improved polymeric powder coating compositions which comprise as essential constituents one or more conventional polymeric powder coating resin and at least one salt of low molecular weight copolymer or terpolymer having recurring monomeric units derived from alpha-olefin and recurring monomeric units derived from α,β-unsaturated carboxylic acid.

The number average molecular weight of the copolymer or terpolymer salt may vary widely and is usually less than about 20,000, and is preferably greater than about 500. The number average molecular weight is preferably from about 1,000 to 15,000, more preferably from about 1,000 to about 6,000, and most preferably from about 1,000 to about 3,500.

The copolymer or terpolymer salt includes at least one type of recurring monomeric unit derived from an α,β-ethylenically unsaturated carboxylic acid. Essentially any such acid can be used. The α,β-ethylenically unsaturated carboxylic acid can be a monocarboxylic acid, or have more than one carboxylic group attached to it. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, hexyl acrylate, ethyl hydrogen fumarate, and maleic anhydride, which is considered to behave like an acid and be an acid in the present invention. The α,β-ethylenically unsaturated carboxylic acids preferably have about 3 to about 12 carbon atoms. More preferred acids are acrylic acid, ethacrylic acid and methacrylic acid, with acrylic acid being most preferred.

As a second essential component, the copolymer or terpolymer salt includes recurring monomeric units derived from at least one type of α-olefin. Essentially any such α-olefin can be used. Illustrative of such olefins are ethylene, propylene, isobutylene, 4-methyl pentene and the like. The alpha-olefin preferably have from 2 to about 8 carbon atoms. The olefin is more preferably propylene or ethylene and is most preferably ethylene.

Upto 100% of the acid functions of the copolymer or terpolymer salt are neutralized with at least one cation from the group consisting of metallic cations having a valence of 1 to 3. Preferably, metallic cations are those metals from Groups IA, IIA, IIIA and the Transition elements. Metal cations which are preferred are copper, iron, sodium, potassium, magnesium, calcium, barium, zinc and aluminum cations, with calcium, zinc and magnesium cations being most preferred. It is preferred to neutralize from 15 to 80 percent of the acid groups of the copolymer or terpolymer, and more preferably from 25 to 60 percent.

The weight percent of monomeric units derived from $\alpha$-olefin and from $\alpha,\beta$-ethylenically unsaturated carboxylic acid may vary widely. In general, the weight percent of units derived from $\alpha$-olefin is from 50% by wgt. to about 97.5% by wgt. and of units derived from acid is from about 2.5% by wgt. to about 50% by wgt., based on the total number of recurring units derived from acid and $\alpha$-olefin. The weight percent of units derived from $\alpha$-olefin is preferably from about 60% by wgt. to about 95% by wgt., more preferably from about 70% by wgt. to about 95% by wgt. and most preferably from about 85% by wgt. to about 95% by wgt., on the aforementioned basis. The percent of recurring monomeric units derived from $\alpha,\beta$-unsaturated carboxylic acid is preferably from about 5% by wgt. to about 40% by wgt., more preferably from about 30% by wgt. to about 5% by wgt. and most preferably from about 15% by wgt. to about 5% by wgt. on the aforementioned basis.

A most preferred copolymer acid salt is a copolymer of ethylene and an $\alpha,\beta$-ethylenically unsaturated monocarboxylic acid having 3 to 6 carbon atoms. A most preferred $\alpha,\beta$-ethylenically unsaturated mono-carboxylic acid is acrylic acid. The ethylene acrylic acid copolymer preferably has an acid number in the range from about 1 to about 200, with an acid number from about 20 to 160 being preferred, and an acid number from about 40 to 120 being most preferred. The acid number is determined by the number of milligrams of potassium hydroxide per gram of polymer acid.

Optionally, the polymer salt may include other monomeric units. Such optional monomeric units include but are not limited to those derived from other $\alpha,\beta$-unsaturated monomers such as vinyl acetate, acrylamide and the like. The amount of optional units is usually not more than 20% by wgt. of the copolymer or terpolymer salt. Preferably, the amount of optional recurring units is from about 5 to 15% by wgt of the polymer salt.

The low molecular copolymer or terpolymer salts used in the present invention can be prepared by any suitable process known in the art. Useful methods are described in U.S. Pat. Nos. 3,658,741; 4,412,040 and 4,381,376 which are incorporated herein by reference.

The amount of the polymer salt included in the composition may vary widely. In determining the amount of the conventional polymeric powder coating resin which is to be substituted by the low molecular weight copolymer salt taught herein, it will be clearly understood by the skilled practitioner that conventional experimental techniques wherein various amounts of the low molecular weight copolymer salt are incorporated into conventional polymer powder coating compositions and the resultant physical properties of the cured/crosslinked composition are subsequently evaluated is a very useful method for determining the optimum amount of substitution of low molecular weight copolymer salt within any conventional polymer powder coating composition. From such a determination, the optimal degree of substitution for a desired set of physical properties may be particularly evaluated. In general, the greater the amount of polymer salt the greater the reduction in gloss, and conversely, the lower the amount of polymer salt, the smaller the reduction in gloss. In general, the amount of copolymer or terpolymer salt is usually at least about 0.5% by weight of the salt and resin in the composition, preferably at least about 0.75% by weight of the salt and resin in the composition, more preferably from about 1 to about 20% by weight of the salt and resin in the composition, and most preferably from about 1 to about 10% by weight of the composition.

Polymeric powder coating compositions which may be used in the compositions according to the present invention include at least one conventional crosslinkable or otherwise curable polymeric powder coating resin such as those conventionally used in polymeric powder coating compositions. Such coating resins which may be used and are presently known to the art include, include but are not limited to: epoxy coating resins, unsaturated polyester coating resins, acrylic coating resins, as well as others. More particularly, conventional polymeric powder coating resins may include polyisocyanate crosslinked polyester coating resins, triglycidyl isocyanurate crosslinked polyester coating resins, polyester epoxy "hybrid"-type coating resins, triglycidyl isocyanurate crosslinked acrylic-type coating resins, polyisocyanate crosslinked acrylic-type coating resins, hydroxy alkylamine crosslinked polyester coating resins, hydroxy alkylamine crosslinked acrylic coating resins, amine crosslinked epoxy coating materials, anhydride crosslinked epoxy coating resins, tetramethoxymethyl glcoluril crosslinked acrylics or polyesters, and uretdione crosslinked polyester-type coating resins. The crosslinking resins may be either aromatic or aliphatic, as well as either blocked or unblocked materials, and for example, include polyisocyanate-type materials blocked with caprolactam and methyl ethyl ketoxime.

Further optional constituents which may find use in the improved polymer coating compositions according to the present invention are those used in conventional polymer coating compositions. Illustrative of such optional materials are conventional catalyzing agents such as stannous octoate, dibutyltin dilaureate and the like; flow control agents such as hexyl acrylate and the like; coloring agents such as pigments or dyes; fillers, such as silica, dolomite, kaolin and the like; processing aids such as silica, catalysts and the like; matting agents such as waxes, silicas, polytetrafluoroethylene and the like; and other conventional processing aids and other conventional additives. Such materials are well known in the art and will not be discussed in great detail.

The composition of this invention exhibits several unique advantages over conventional coating compositions. For example, the composition of this invention exhibits reduction in gloss without substantially affecting physical properties such as flexibility, impact resistance, chemical resistance and adhesion to the substrate.

The improved polymer powder coating compositions according to the present invention may be made and used in forming polymeric coatings on articles in accordance with conventional techniques. Such techniques are well known in the art and will not be described in great detail. In an exemplary conventional process, the constituents of the composition are measured out and blended in a suitable apparatus and subsequently the blended constituents are provided to the throat of a kneader or extruder apparatus which heats and plastificates the blended constituents into a mass which mass is subsequently extruded into any desired form. Extruded strands, films, ribbons, (or the like) which are then chopped, ground, or otherwise comminuted into a fine powder wherein the particulates which form the powder have a size of about 200 microns or less, preferably 120 microns and less.

In a process described above wherein a single or twin extruder is used to plasticate the blended constituents, it is to be recognized that the temperature of the extruder barrel be sufficiently high so to insure that the polymer be melted.

The powder composition may be applied to the surface of an article in any conventional manner known to the art. One such manner utilizes a corona discharge gun wherein the powder is imparted with a negative electrostatic charge and wherein the article is grounded, and the negatively charged powdered particles are then propelled at the grounded surface where the attraction of the oppositely charged particles induces their retention at the surface. Subsequently, the coated surface is then placed in a oven at a elevated temperature and for a sufficient time to ensure the cross-linking and/or curing of the polymeric powder coating resin materials within the powder coating composition or in the alternative other crosslinking or curing means such as the utilization of infrared waves are contemplated.

In a further manner useful as an alternative production process utilizes a fluidized bed. In such process, the surface upon which the polymeric powder is to be imparted is heated and placed in a chamber proximate the fluidized bed from wherein the particles are blown and due to electrostatic attractive forces and/or the rapid action of the heated article in melting the powder, are collected upon the surface and fused.

In a third alternative manner of production known to the practitioner as "tribocharging", an electrostatic charge generated by frictional forces is imparted to the polymeric powder coating to be deposited. Then due to electrostatic forces, the powder then is attracted to the surface and thereupon retained during a subsequent curing and/or crosslinking step, usually via exposure to an elevated temperature in an oven.

Each of these conventional powder deposition methods which are useful in providing a layer of the polymeric powder coating to the surface is subsequently crosslinked and/or cured so to fuse the particles and to form a continuous polymeric coating. Such may be accomplished in several manners as is conventionally known to the art.

In one popular manner, the surface or article which has a polymeric powder coating retain thereupon due to electrostatic and/or other forces is introduced to a dry circulating air oven wherein the surface is retained at an elevated temperature for a sufficient time so to effect an acceptable degree of curing and/or crosslinking.

In a second alternative method, articles and/or surfaces are provided with a polymeric powder coating and then subjected to exposure to electromagnetic radiation, particularly in the infrared spectra region. Such exposure to infrared frequencies causes the curing and/or crosslinking of the polymeric constituents of the polymeric powder coating composition on the surface to fuse into a continuous layer.

The articles or surfaces which are provided with polymeric powder coating according to the present invention may be used in the construction of a broad range of useful items. For example, wherein a cold rolled steel sheet or panel is provided with a cured/crosslinked powder coating in accordance with the teaching herein, the same may be used to fabricate articles which include, but are not limited, to furniture, cabinets, shelving, partition panels, panels for use in automotive, aerospace and aeronautical applications, containers, boxes, fencing, housing and containers for electro and/or mechanical apparatus such as electro components, mechanical components, pipes, wires, cables, including the formation of one or more layers on a pipe and/or wire or cable construction, as well as other items not particularly denoted here.

The invention is more easily understood by reference to specific embodiments which are representative examples according to the teachings of the current invention. It must be understood however, that the specific embodiments discussed herein are provided only for the purpose of illustration, and not by way of limitation, and it is to be further understood that the invention may be practiced otherwise than specifically described and yet be within the inventive scope.

EXAMPLE I

In the following examples of compositions according to comparative examples and those in accordance with the present invention, the following general production process was used.

General Procedure

The constituents of the respective composition were weighed out and introduced to a Waring blender wherein they were dry blended to form a well mixed dry particulate blend which was essentially homogeneous. The composition of the test blends are set forth in the following Tables I and II.

In Tables I and II, the abbreviations have the following means:

(a) "Polyester Resin" is a carboxyl functional polyester resin obtained from EMS-American Grilion, Inc. under the tradename V76-12.

(b) "Curing Agent" is a hydroxy alkylamine obtained from Rohm & Haas Co. under the tradename Primid XL 552.

(c) "AC-II" is a ethylene/acrylic acid copolymer obtained from Allied-Signal Inc. under the tradename of ACLYN 291A in which 50% of the acid functions are neutralized with zinc cation and which has a melting temperature of 102° C., a viscosity at 190° C. of 8200 cps, a hardness of 1.1 dmm and an equivalent wgt 748.

(d) "Flow Modifier" is hexyl/acrylate obtained from Monsanto under the tradename modalflow III.

(e) "Carbon Black" is carbon black obtained from Cabot Inc. under the tradename "Black Pearls, 700".

(f) "Filler" is barium sulfate obtained from Sachtleben Inc. under the tradename of "Blanc Fixe F".

TABLE I

Crosslinked Polyester - Pigment/Binder = 0.4
(Parts by Weight)

| COMPONENT | COMPOSITION & AMOUNTS | | | | |
|---|---|---|---|---|---|
| | A | B | C | D | E |
| Polyester Resin | 503 | 489 | 476 | 450 | 424 |
| Curing Agent | 26.5 | 27.6 | 28.0 | 29.5 | 31.0 |
| AC-II | 0 | 12.5 | 25.0 | 50.0 | 75.0 |
| Flow Modifier | 7.8 | 7.8 | 7.8 | 7.8 | 7.8 |
| Carbon Black | 11.0 | 11.0 | 11.0 | 11.0 | 11.0 |
| Benzoin | 1.6 | 1.6 | 1.6 | 1.6 | 1.6 |

TABLE I-continued

Crosslinked Polyester - Pigment/Binder = 0.4
(Parts by Weight)

| COMPONENT | COMPOSITION & AMOUNTS | | | | |
|---|---|---|---|---|---|
| | A | B | C | D | E |
| Filler | 202 | 202 | 202 | 202 | 202 |

TABLE II

Crosslinked Polyester - Pigment/Binder = 0.63
(Parts by Weight)

| COMPONENT | COMPOSITION & AMOUNTS | | | | |
|---|---|---|---|---|---|
| | F | G | H | I | J |
| Polyester Resin | 432 | 419 | 409 | 387 | 364 |
| Curing Agent | 3.0 | 23.7 | 24.1 | 25.4 | 26.5 |
| AC-II | 0 | 11 | 22 | 43 | 64 |
| Flow Modifier | 7.8 | 7.8 | 7.8 | 7.8 | 7.8 |
| Carbon Black | 11 | 11 | 11 | 11 | 11 |
| Benzoin | 1.6 | 1.6 | 1.6 | 1.6 | 1.6 |
| Filler | 275 | 275 | 275 | 275 | 275 |

Subsequently, the dry particulate blend was provided to the inlet throat of a Haake twin screw extruder having two standard duty mixing screws. The temperature profile across the extruder was set as follows: zone 1, 70° C.; zone 2, 100° C.; zone 3, 115° C. The throat was water cooled and the die temperature was set at about 125° C. The screws rotated at a speed of approximately 50 rpm.

The extruded formulation exiting the die was cooled, and subsequently comminuted to a fine powder through a 140 mesh sieve. The particle size of the powder was not in excess of about 106 microns.

The fine powder of the respective formulation was then provided to a Ransberg type 706 cup gun operated at 70 kV, which was used to spray cold rolled steel panels so to provide a dry film thickness of upto 2.0–2.5 mils. The panels were then baked at a temperature of 200° C. for 10 minutes to cure the panels.

The panels were evaluated in accordance with conventional test protocols which included the following: Adhesion according to the Standard Test Method for Measuring Adhesion by Tape Test, ASTM D 3359 (1987); Impact Resistance according to the Standard Test Method for Resistance of Organic Coatings to the Effects of Rapid Deformation (Impact), ASTM D 2794 (1984); Flexibility according to the Standard Method for Coating Flexibility of Prepainted Sheet, ASTM D 4145 (1983); Gloss according to the Standard Method for Specular Gloss, ASTM D 523 (1985); as well as resistance to softening to organic solvents by "double rubbing" a respective sample with methyl ethyl ketone ("MEK") to evaluate if the respective sample exhibited softening.

All testing was performed on the cold rolled steel sheet as indicated except that impact resistance was evaluated for all compostions on 22 guage steel treated with a conventional pretreatment agent, "Bonderite ® 901" which is commercially available from the Henkel Corp. Test results are set forth in FIG. 1, and in the following Tables III and IV.

TABLE III

| Parameter | COMPOSITION & VALUE | | | | |
|---|---|---|---|---|---|
| | A | B | C | D | E |
| Adhesion (ATM D3359) | 5B | 5B | 5B | 5B | 5B |
| Impact Resistance (Gardner, in./lb.) Direct | 160 | 160 | 160 | 160 | 160 |
| Reverse | 160 | 160 | 160 | 160 | 160 |
| Gloss (Initial) 60° | 88 | 84 | 72 | 53 | 59 |
| Gloss (Initial) 20° | 59 | 55 | 32 | 12 | 14 |
| MEK Resistance (200 Double Rubs | Pass | Pass | Pass | Pass | Pass |
| Flexibility(T-Bend) | OT | OT | OT | OT | OT |

TABLE IV

| Parameter | COMPOSITION & VALUE | | | | |
|---|---|---|---|---|---|
| | F | G | H | I | J |
| Adhesion (ATM D3359) | 5B | 5B | 5B | 5B | 5B |
| Impact Resistance (Gardner, in./lb.) Direct | 160 | 160 | 160 | 160 | 160 |
| Reverse | 160 | 160 | 160 | 160 | 160 |
| Gloss (Initial) 60° | 91 | 87 | 72 | 55 | 44 |
| Gloss (Initial) 20° | 57 | 47 | 25 | 13 | 17 |
| MEK Resistance (200 Double Rubs | Pass | Pass | Pass | Pass | Pass |
| Flexibility(T-Bend) | OT | OT | OT | OT | OT |

The results show that the greatest reduction of gloss was obtained with the highest concentration of AC-II was also effective at reducing the gloss at 20°. Furthermore, film properties such as chemical resistance, impact resistance, adhesion and flexibility were not compromised to any significant extent (Tables 2 and 4)

EXAMPLE II

A series of experiments were carried out to determine the effect of film thickness on the efficiency of gloss reduction. In these experiments, formulas F through J (See Table II) were coated on steel panels at dry film thickness of 1.6 to 2.0 mils and 2.0 to 2.5 mils. The results are shown in FIG. 2.

The effect of film thickness on gloss was greatest at full gloss and diminished as the concentration of ACLYN 291A increased and the gloss was reduced. This result illustrates that in semi-gloss finishes, ACLYN 291A is effective in both thick and thin film applications.

EXAMPLE III

In order to determine if a specific metallic cation would be more efficient in reducing gloss, ionomers of sodium, calcium, magnesium and zinc were tested in formulation D (Table 1). AC 580 was also tested to determine if an unmodified ethylene acrylic acid copolymer would also reduce gloss. A control sample (Formula A) was also included in the experiment. The results are set forth in the following Table V.

In the table, the abbreviations have the following meanings:

(a) "AC-I"' is a ethylene/acrylic acid copolymer obtained from Allied-Signal Inc. under the tradename of ACLYN 580 which has a melting temperature of 102° C., a viscosity at 140° C. of 650 cps, a hardness of 4.1 dmm and an equivalent wgt of 748.

(b) "AC-II"' is a ethylene/acrylic acid copolymer obtained from Allied-Signal Inc. under the tradename of ACLYN 291A in which from 50% of the acid functions are neutralized with zinc cation and which has a melting temperature of 102° C., a viscosity at 190° C. of 8200 cps, a hardness of 1.1 dmm and an equivalent wgt of 748.

(c) "AC-III"'" is a ethylene/acrylic acid copolymer obtained from Allied-Signal Inc. under the tradename of ACLYN 201A in which from 50% of the acid functions are neutralized with calcium cation and which has a melting temperature of 102° C., a viscosity at 190° C. of 5500 cps, a hardness of 1.2 dmm and an equivalent wgt of 748.

(d) "AC-IV"'" is a ethylene/acrylic acid copolymer obtained from Allied-Signal Inc. under the tradename of ACLYN 232A in which 50% of the acid functions are neutralized with magnesium cation and which has a melting temperature of 117° C., a viscosity at 190° C. of 2400 cps, a hardness of 0.8 dmm and an equivalent wgt 748.

(e) "AC-V"'" is a ethylene/acrylic acid copolymer obtained from Allied-Signal Inc. under the tradename of ACLYN 262A in which 50% of the acid functions are neutralized with sodium cation and which has a melting temperature of 102° C., a viscosity at 190° C. of 3100 cps, a hardness of 0.6 dmm and an equivalent wgt 748.

TABLE V

| | Metallic Ions vs Gloss Reduction | | |
|---|---|---|---|
| Product | Cation | 60° Gloss | 20° Gloss |
| Control | None | 88 | 57 |
| AC-I | None | 79 | 39 |
| AC-II | Zinc | 42 | 12 |
| AC-III | Calcium | 50 | 12 |
| AC-IV | Magnesium | 40 | 10 |
| AC-V | Sodium | 72 | 28 |

The results show that calcium, zinc and magnesium salts were effective in reducing gloss. The sodium salt was not as efficient. AC-I, the unmodified polymer, was not an effective gloss reducing agent.

It will be appreciated that the specifications and examples set forth herein are by way of illustration and not limitation, and that various modifications and changes may be made without departing from the spirit and scope of the present invention, whose limitations are bounded only by the appendant claims.

What is claimed is:

1. A polymeric powder coating composition which comprises:
   (a) a cross-linkable unsaturated polyester resin and
   (b) a salt of copolymer or terpolymer derived from an α-olefin and an α,β-ethylenically unsaturated carboxylic acid.

2. A polymeric powder coating composition according to claim 1 wherein the amount of α-olefin derived units is from about 50% by wgt. to about 97.5% by wgt. and the amount of α,β-ethylenically unsaturated carboxylic acid derived units is from about 2.5% by wgt. to about 50% by wgt., based on the total weight of recurring monomeric units derived from said acid and said olefin.

3. A polymeric powder coating composition according to claim 2 wherein the amount of said α-olefin derived units is from about 60 to about 95% by wgt. and the amount of said acid derived units is from about 5 to about 40% by wgt.

4. A polymeric powder coating composition according to claim 3 wherein the amount of said α-olefin derived units is from about 85 to about 95% by wgt. and the amount of said acid derived units is from about 15 to about 5% by wgt.

5. A polymeric powder coating composition according to claim 1 wherein cations of said salt are selected from the group consisting of copper, iron, sodium, potassium, magnesium, calcium, barium, zinc and aluminum.

6. A polymeric coating composition according to claim 5 wherein said cations are selected from the goup consisting of calcium, zinc and magnesium.

7. A polymeric powder coating composition according to claim 1 wherein the salt has a degree of neutralization of upto 100%.

8. A polymeric powder coating composition according to claim 7 wherein the degree of neutralization is at least 15%.

9. A polymeric powder coating composition according to claim 8 wherein the degree of neutralization is from about 15 to about 80%

10. A polymeric powder coating compostion according to claim 9 wherein the degree of neutralization is from about 25 to about 60%.

11. A polymeric powdered coating composition according to claim 1 wherein said α-olefin is selected from the group consisting of ethylene and propylene.

12. A polymeric powder coating composition according to claim 1 wherein said acid is selected from the group consisting of acrylic acid, ethacrylic acid and methacrylic acid.

13. A polymeric powder composition according to claim 11 wherein said α-olefin is ethylene.

14. A polymeric powder coating composition according to claim 12 wherein said acid is acrylic acid.

15. A polymeric powder coating composition according to claim 1 wherein said copolymer or terpolymer has a number average molecular weight equal to or less than about 20,000.

16. A polymeric powder coating composition according to claim 15 wherein said molecular weight is from about 1,000 to about 6,000.

17. A polymeric powder coating composition according to claim 16 wherein the at least one copolymer salt is a copolymer of from about 60 to about 95% ethylene and from about 40 to about 95% acrylic acid wherein from about 20 to 60% of the acid functions are neutralized with a cation selected from the group consisting of copper, iron, sodium, potassium, magnesium, calcium, barium, zinc and aluminum, said salt having a number average molecular weight from about 500 to about 6000.

18. A polymeric powder coating composition according to claim 17 wherein the cation of said copolymer salt is calcium, zinc, aluminum or a combination thereof.

19. A polymeric powder coating composition according to claim 1 wherein the cations of said salt are selected from the group consisting of metal cations from Groups IIA and IIB of the Periodic Table of Elements.

20. A polymeric powder coating composition according to claim 1 wherein:
   said resin is in an amount of from about 99.5% to 80% by total weight of said salt and resin;
   said salt is in an amount of from about 0.5% to about 20% by total weight of said salt and said resin;
   said salt is a copolymer having a number average molecular weight of from about 500 to about 6000 and comprises from about 40 to about 95% ethylene and from about 40 to about 95% of an α,β- unsaturated acid selected from the group consisting of acrylic acid, ethacrylic acid and methacrylic acid, wherein at least about 15% of the acid functions are neutralized with a cation selected from the group consisting of metal cations from Group IIA and IIB of the Periodic Table of Elements.

21. A polymeric powder coating resin according to claim 20 wherein:
said acid is acrylic acid;
said cation is calcium, zinc or magnesium; and
said resin is an unsaturated polyester resin.

* * * * *